United States Patent
Stephens et al.

(10) Patent No.: US 11,959,427 B2
(45) Date of Patent: Apr. 16, 2024

(54) LEAK TESTING APPARATUS

(71) Applicant: Honda Motor Co., Ltd., Tokyo (JP)

(72) Inventors: Kaleb Stephens, Cross Plains, TN (US); John Michael Scelsi, Pell City, AL (US); Cody Weldon Cline, Lincoln, AL (US); Christopher Ray Wills, Sylacauga, AL (US)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 17/686,879

(22) Filed: Mar. 4, 2022

(65) Prior Publication Data
US 2023/0279818 A1 Sep. 7, 2023

(51) Int. Cl.
| | |
|---|---|
| *G01M 3/26* | (2006.01) |
| *F02D 13/02* | (2006.01) |
| *F02D 35/02* | (2006.01) |
| *F02D 41/00* | (2006.01) |
| *F02D 41/22* | (2006.01) |

(Continued)

(52) U.S. Cl.
CPC ....... *F02D 35/023* (2013.01); *F02D 13/0203* (2013.01); *F02D 41/0002* (2013.01); *F02D 41/22* (2013.01); *F02F 11/002* (2013.01); *G01M 3/025* (2013.01); *G01M 3/26* (2013.01); *G01M 3/2876* (2013.01); *G01M 13/027* (2013.01); *F02D 2041/001* (2013.01); *F02D 2041/225* (2013.01)

(58) Field of Classification Search
CPC .................................................... G01M 3/025
See application file for complete search history.

(56) References Cited

U.S. PATENT DOCUMENTS

| | | | |
|---|---|---|---|
| 5,569,841 A | 10/1996 | Hoban et al. | |
| 6,363,921 B1 | 4/2002 | Cook et al. | |

(Continued)

FOREIGN PATENT DOCUMENTS

| | | |
|---|---|---|
| CN | 201417206 Y | 3/2010 |
| CN | 103048100 A | 4/2013 |

(Continued)

OTHER PUBLICATIONS

How to do A leakdown test: Mobil™ Motor Oils. Mobil. (n.d.). https://www.mobil.com/en/lubricants/for-personal-vehicles/auto-care/vehicle-maintenance/how-to-do-a-leakdown-test (Year: 2020).*

*Primary Examiner* — Alexander A Mercado
(74) *Attorney, Agent, or Firm* — Suzanne Gagnon; American Honda Motor Co., Inc.

(57) ABSTRACT

An apparatus is provided to test valves. The apparatus includes an actuation mechanism having an actuator that seals a valve of a combustion chamber of an engine. The apparatus further includes a flow control device that controls a flow of a pressurized fluid to the combustion chamber. The apparatus further includes a plurality of sensors having a first sensor and a second sensor. The first sensor is disposed in an inlet port of the combustion chamber to detect a first flow rate of the pressurized fluid in the inlet port. The second sensor is disposed in an exhaust port of the combustion chamber to detect a second flow rate of the pressurized fluid in the exhaust port. The apparatus further includes a notification device configured to generate an alert based on the detected first flow rate and the detected second flow rate.

20 Claims, 8 Drawing Sheets

(51) Int. Cl.
F02F 11/00 (2006.01)
G01M 3/02 (2006.01)
G01M 3/28 (2006.01)
G01M 13/027 (2019.01)

(56) References Cited

U.S. PATENT DOCUMENTS

| | | |
|---|---|---|
| 7,937,988 B2 | 5/2011 | Degler et al. |
| 8,833,074 B2 | 9/2014 | Hayashi et al. |
| 8,869,527 B2 | 10/2014 | Werstat et al. |
| 10,481,043 B2 | 11/2019 | Nelson |
| 10,900,858 B2* | 1/2021 | Banschbach .......... G01M 15/02 |
| 2016/0011070 A1 | 1/2016 | Marek et al. |
| 2022/0276113 A1* | 9/2022 | Yamagata .......... F01M 13/0011 |
| 2022/0291074 A1* | 9/2022 | Yamagata ............. F02D 41/18 |

FOREIGN PATENT DOCUMENTS

| | | |
|---|---|---|
| CN | 207556764 U | 6/2018 |
| CN | 109506852 A | 3/2019 |
| CN | 210090016 U | 2/2020 |
| CN | 212432451 U | 1/2021 |
| DE | 102016209390 A1 | 11/2017 |
| KR | 200480851 Y1 | 7/2016 |

\* cited by examiner

700

Control actuation mechanism to activate actuator of actuation mechanism and seal valve of combustion chamber of engine based on activation of actuator 702

Control flow control device to control flow of pressurized fluid to combustion chamber 704

Control plurality of sensors to detect first flow rate in inlet port via first sensor and further detect second flow rate in exhaust port via second sensor 706

Determine leakage of pressurized fluid from combustion chamber based on detected first flow rate and detected second flow rate 708

Control notification device to generate alert based on determined leakage of pressurized fluid from combustion chamber 710

FIG. 7

LEAK TESTING APPARATUS

BACKGROUND

Valves may be generally used to control a fluid flow (such as an airflow, a gasoline flow, or a combination of both) in a machine (such as an engine). Valves may releasably couple with ports (such as inlet and outlet ports) of the machine and configured to control the fluid flow in the machine. In certain cases, there may be a faulty valve in the valves that may allow a leakage of the fluid flow in a corresponding port of the machine. The leakage of the fluid flow may lead to improper valve actuations and may subsequently affect performance of the machine (such as an incomplete combustion in the engine). Therefore, during the installation of the valves, it may be necessary to test the valves for any leakage between the valves and the ports of the machine.

In some instances, there may be spring-biased devices that may be configured to couple the valves with the ports of the machine. For example, the spring-biased devices may include a spherical tip biased by a spring, which may be configured to engage with the valves, to further seal the valves with corresponding ports. Based on the engagement, an operator may test for the leakage of the valves in the machine. In certain cases, the spherical tip and/or the spring associated with the spherical tip may wear over time, which may lead to a false-positive measurement of the leakage between the valves and the ports of the machine.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides an apparatus. The apparatus may include an actuation mechanism having an actuator that may be configured to seal a valve of a combustion chamber of an engine. The apparatus may further include a flow control device that may be configured to control a flow of a pressurized fluid to the combustion chamber. The apparatus may further include a plurality of sensors having a first sensor and a second sensor. The first sensor may be disposed in an inlet port of the combustion chamber to detect a first flow rate of the pressurized fluid in the inlet port. The second sensor may be disposed in an exhaust port of the combustion chamber to detect a second flow rate of the pressurized fluid in the exhaust port. The apparatus may further include a notification device configured to generate an alert based on the detected first flow rate and the detected second flow rate.

Another exemplary aspect of the disclosure provides an apparatus. The apparatus may include an actuation mechanism having a plurality of actuators. Each actuator of the plurality of actuators may be configured to seal a corresponding valve of a plurality of valves of a plurality of combustion chambers of an engine. The apparatus may further include a plurality of flow control devices that may be configured to control a flow of a pressurized fluid to each combustion chamber of the plurality of combustion chambers. The apparatus may further include a plurality of sensors having a first set of sensors and a second set of sensors. Each sensor of the first set of sensors may be disposed in a corresponding inlet channel of an inlet manifold to detect a first flow rate of the pressurized fluid in the inlet manifold. Each sensor of the second set of sensors may be disposed in a corresponding exhaust channel of an exhaust manifold to detect a second flow rate of the pressurized fluid in the exhaust manifold. The apparatus may further include a notification device that may be configured to generate an alert based on the detected first flow rate and the detected second flow rate.

Another exemplary aspect of the disclosure provides a method to test valves. The method may include controlling an actuation mechanism to activate an actuator of the actuation mechanism and seal a valve of a combustion chamber of an engine based on the activation of the actuator. The method may further include controlling a flow control device to control a flow of a pressurized fluid to the combustion chamber. The method may further include controlling a plurality of sensors having a first sensor and a second sensor. The first sensor may be disposed in an inlet port of the combustion chamber to detect a first flow rate of the pressurized fluid in the inlet port. The second sensor may be disposed in an exhaust port of the combustion chamber to detect a second flow rate of the pressurized fluid in the exhaust port. The method may further include determining a leakage of the pressurized fluid from the combustion chamber based on the detected first flow rate and the detected second flow rate. The method may further include controlling a notification device to generate an alert based on the determined leakage of the pressurized fluid from the combustion chamber.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

BRIEF DESCRIPTION OF THE DRAWINGS

FIG. 7 is a flowchart that illustrates an exemplary method for leak testing of valves, via the apparatus of FIG. 1, in accordance with an embodiment of the disclosure.

Figure 1A:
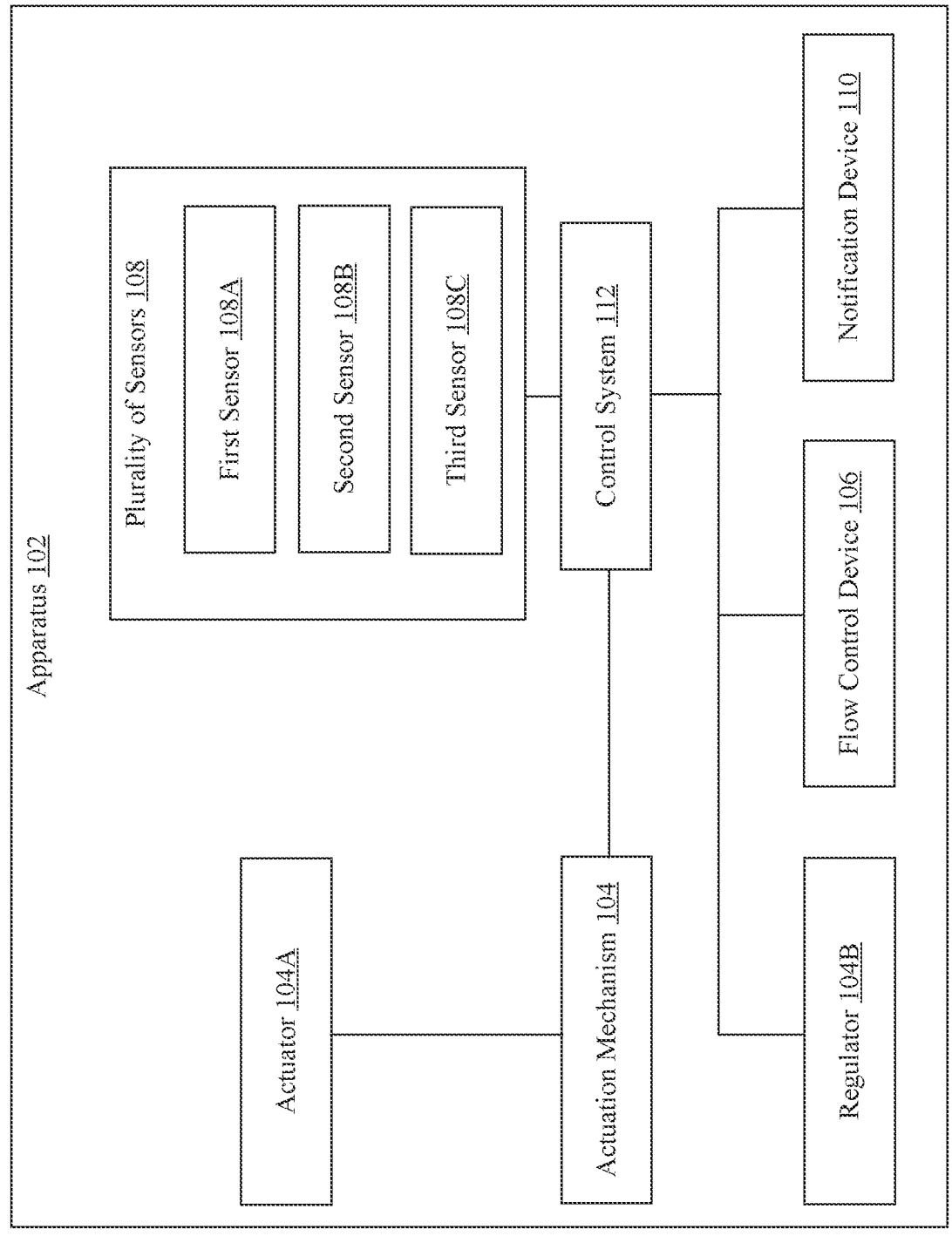
FIGS. 1A-1B are diagrams that collectively illustrate an exemplary apparatus for leak testing of valves, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide an apparatus to test leakage in valves of a machine (such as an engine head). The apparatus may include an actuation mechanism having an actuator that may be coupled with a valve of a combustion chamber of the machine. The actuator may have a uniform surface area (such as a flat surface area) with a uniformly distributed pressure that may structurally conform to a surface area (such as a flat surface area) of the valve. Based on the control of the actuation mechanism, the actuator with the uniform surface area may directly mate with the surface area of the valve and seals the valve with a corresponding port (such as an inlet port or an outlet port) of the machine. Therefore, because of the uniform surface area of the actuator, there may be an improvement in sealing of the valves and corresponding ports, which may avoid any false-positive measurement (such as an incorrect measurement) of the leakage between the valves and the ports of the machine. The apparatus may further include a flow control device to control a flow of a pressurized fluid to the combustion chamber of the machine. The apparatus may be configured to detect a flow rate of the pressurized fluid in the corresponding port of the machine and determine the leakage in the valve that may be sealed to the corresponding port of the machine. Details of the sealing of valve and the determination of the leakage in the valve are further described, for example, in FIGS. 1A-1B and FIG. 3.

The apparatus may further include a plurality of sensors which may include a first sensor and a second sensor. The first sensor may be disposed in an inlet port of the combustion chamber to detect a first flow rate of the pressurized fluid in the inlet port. The second sensor may be disposed in an exhaust port of the combustion chamber to detect a second flow rate of the pressurized fluid in the exhaust port. Based on the movement of the actuator to seal the valves with corresponding ports of the machine and subsequent flow of the pressurized fluid in the combustion chamber, the apparatus may control the plurality of sensors to detect at least one of: the first flow rate or the second flow rate, to further determine the leakage between the valves and corresponding ports of the machine. Therefore, as the leakage is detected by the plurality of sensors of the disclosed apparatus and not manually measured by an operator, the false-positive measurement of the leakage between the valves and corresponding ports of the machine may be avoided. Details of the plurality of sensors are further described, for example, in FIGS. 1A-1B.

The apparatus may further include a notification device configured to generate an alert (such as a visual notification, an audible notification, or an audio-visual notification) based on the detected first flow rate and the detected second flow rate. For example, in case the apparatus determines the leakage between the valves and corresponding ports of the machine based on the detected first flow rate and the detected second flow rate, the apparatus may control the notification device to generate the alert to remotely inform the operator about a status (such as a presence or an absence) of the leakage between the valves and corresponding ports of the machine. Therefore, as the operator is remotely notified about the leakage of each valve in the corresponding port of the machine, the operator may save time (for example to resolve the issues with respect to the leakage) that may be incurred in a manual inspection of each valve of the machine. Details of the remote notification are further described, for example, in FIGS. 1A-1B.

Reference will now be made in detail to specific aspects or features, examples of which are illustrated in the accompanying drawings. Wherever possible, corresponding or similar reference numbers will be used throughout the drawings to refer to the same or corresponding parts.

Figure 1B:
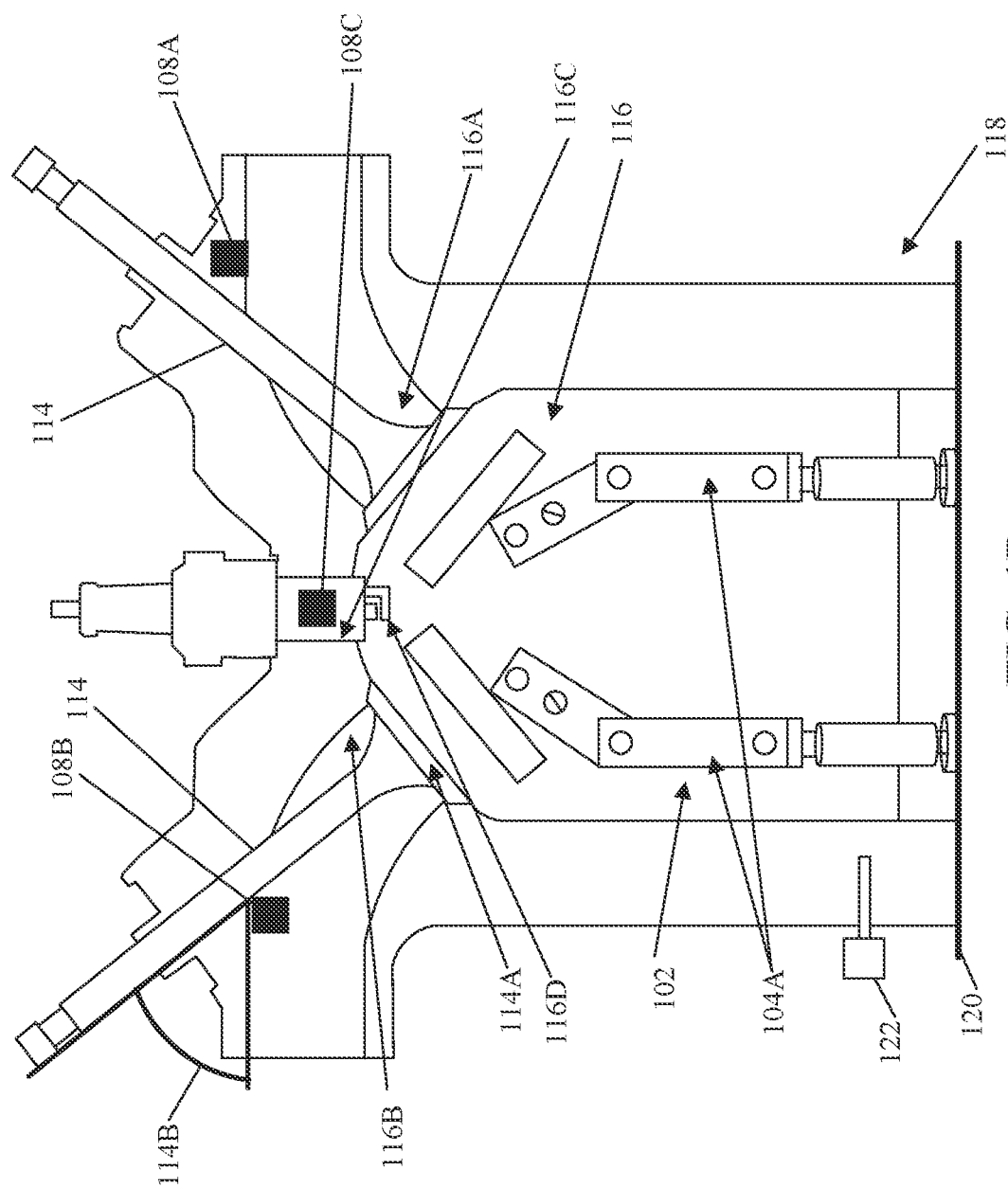

FIGS. 1A-1B are diagrams that collectively illustrate an exemplary apparatus for leak testing of valves, in accordance with an embodiment of the disclosure. With reference to FIG. 1A, there is shown a block diagram 100 of an apparatus 102. The apparatus 102 may include an actuation mechanism 104 which may further include an actuator 104A and a regulator 104B. The apparatus 102 may further include a flow control device 106, a plurality of sensors 108, and a notification device 110. In an embodiment, the apparatus 102 may further include a control system 112 that may be configured to control the actuation mechanism 104 to activate the actuator 104A and seal a valve 114 of a combustion chamber 116 of an engine 118 (shown in FIG. 1B), to determine a leakage between the valve 114 and a corresponding port of the engine 118.

Referring to FIG. 1B, there is shown the actuator 104A of the apparatus 102 aligned with the valve 114 of the combustion chamber 116 of the engine 118. The combustion chamber 116 of the engine 118 may include an inlet port 116A, an exhaust port 116B, and a charging port 116C. The engine 118 may also be coupled to a pallet 120 (such as a jig) associate with the apparatus 102. Based on the alignment of the engine 118 with the apparatus 102, the apparatus 102 may determine the leakage between the valves and corresponding ports of the engine 118. Based on the determination of the leakage, the apparatus 102 may also control a radio-frequency tag 122 associated with the engine 118 to store a status of the leakage.

The apparatus 102 may be configured to control components (such as, the actuation mechanism 104, the flow control device 106, and the plurality of sensors 108) to determine the leakage between the valve 114 and the corresponding port of the engine 118. Based on the determination of the leakage, the apparatus 102 may control the notification device 110 to generate an alert that may be associated with a status (such as a presence or an absence) of the leakage. In an embodiment, the apparatus 102 may be configured to selectively test a particular valve (such as the valve 114) in a particular combustion chamber (such as the combustion chamber 116) of the engine 118, for the determination of the leakage between the particular valve and a corresponding port of the engine 118. For example, the apparatus 102 may be configured to selectively control the actuator 104A, to selectively seal the valve 114 with the corresponding port associated with the combustion chamber 116 of the engine 118 and determine the leakage between the valve 114 and the corresponding port of the engine 118. Therefore, it may be easier for the operator to selectively determine and/or recheck the leakage in each combustion chamber of the engine 118, via the apparatus 102. Details of the determination of the leakage are further described below with reference to FIG. 1B and, for example, in FIG. 3.

In another embodiment, the apparatus 102 may be configured to concurrently test all valves (such as the valve 114) in all combustion chambers (such as the combustion chamber 116) of the engine 118, for the determination of the leakage between the valves and corresponding ports of the engine 118. For example, the apparatus 102 may be configured to control the actuator 104A, to seal all the valves with the corresponding ports of the combustion chambers of the engine 118 and determine the leakage between the valves and the corresponding ports of all the combustion chambers in the engine 118. Therefore, it may be timesaving for the operator to concurrently determine the leakage in all combustion chambers of the engine 118, using the disclosed apparatus 102. Details of the concurrent determination of the leakage in all combustion chambers are further described, for example, in FIG. 6.

The apparatus 102 may also be coupled to a part of an assembly line of a manufacturing unit, to test the leakage between the valve 114 and the corresponding port of the combustion chamber 116 of the engine 118. For example, the apparatus 102 may be disposed in the part (such as a ceiling portion or a floor portion) of the assembly line and other components (such as the actuator 104A of the actuation mechanism 104 and the plurality of sensors 108) of the apparatus 102 may be coupled to engine 118 to test the leakage between the valve 114 and the corresponding port of the combustion chamber 116 of the engine 118.

The actuation mechanism 104 may include suitable logic, control system, and interfaces that may be configured to control the actuator 104A to seal the valve 114 of the combustion chamber 116 of the engine 118. In an example, the actuation mechanism 104 may be configured to retractably extend the actuator 104A to mate with the valve 114 and seal the valve 114 with the corresponding port of the combustion chamber 116. Details of the retractable extension of the actuator 104A are further described below with reference to FIG. 1B. In another example, the actuation mechanism 104 may include press pucks (for example, a cushion pad, a pressure pad and the like) that may be controlled based on the pressurized fluid from the flow control device 106. Based on the pressurized fluid in the combustion chamber 116, the press pucks may be configured to directly mate with the valve 114 and seal the valve 114 with the corresponding port of the combustion chamber 116. Details of such direct mating of press pucks with the valve 114 of the combustion chamber 116 are further described, for example, in FIG. 5.

In an embodiment, the actuation mechanism 104 may be configured to control at least one of: a position (such as a change in position due to one of: a linear movement or an angular movement) of the actuator 104A, a velocity (such as one of: a linear velocity or an angular velocity) of the actuator 104A, or an acceleration (such as one of: a linear acceleration or an angular acceleration) of the actuator 104A, based on a need of the operator. For example, in case the operator wants to reduce a time taken to test the leakage, the actuation mechanism 104 may increase the velocity of the actuator 104A to speed up mating of the actuator 104A with the valve 114 of the combustion chamber 116 and subsequent sealing of the valve 114 with the corresponding port of the combustion chamber 116. In another example, in case the operator wants to carefully check the leakage of a valve (such as the valve 114) with a corresponding port in an intricate location of the machine (such as the engine 118), the actuation mechanism 104 may reduce the velocity of the actuator 104A to improve docking (such as mating) of the actuator 104A with the valve 114 of the combustion chamber 116 in the intricate location of the machine.

The actuation mechanism 104 may be configured to activate the actuator 104A based on one of: a stable pressure or a progressive pressure. In an example, the stable pressure may correspond to a constant pressure of the actuator 104A on the valve 114 of the combustion chamber 116 to seal the valve 114 of the combustion chamber 116. In another example, the progressive pressure may correspond to a variable pressure (such as an incremental variable pressure, or a decremental variable pressure) of the actuator 104A on the valve 114 of the combustion chamber 116 to seal the valve 114 of the combustion chamber 116.

The actuator 104A may include suitable logic, control system, and interfaces that may be associated with the actuation mechanism 104 and configured to be translated linearly and/or angularly, to mate with the valve 114 and subsequently seal the valve 114 with the corresponding port of the engine 118. The actuator 104A may include one or more kinematic linkages (such as metallic bars) that may be configured to retractably extend to mate with the valve 114 and subsequently seal the valve 114 with corresponding port of the combustion chamber 116. Each kinematic linkage of the actuator 104A shown in FIG. 1B may have a substantially rectangular structure. The substantially rectangular structure is merely an example, and the actuator 104A may have any other structure, such as, but not limited to, a substantially cylindrical structure, or a substantially polygonal structure.

In an embodiment, there may be different types of actuators in the actuation mechanism 104. For example, the actuation mechanism 104 may include one of: a mechanical actuator, an electric actuator, a hydraulic actuator, or a pneumatic actuator, which may be configured to selectively seal the valve 114 of the combustion chamber 116 of the engine 118. For example, the actuator 104A may be a servomotor that may be activated to control the movement of kinematic linkages of the actuator 104A in the combustion chamber 116, so that, the actuator 104A may mate and seal with the valve 114 of the combustion chamber 116. The servomotor is merely an example of the actuator 104A. Other examples of the actuator 104A may include, but are not limited to, electrical actuators (such as, a stepper motor, or an induction motor, an AC motor, or a DC motor), hydraulic actuators (such as a hydraulic cylinder), or pneumatic actuators (such as a pneumatic cylinder), which may be configured to control the movement of the kinematic linkages of the actuator 104A.

In an embodiment, the actuation mechanism 104 may further include the regulator 104B to adjust a sealing pressure for the actuator 104A to seal the valve 114 with the corresponding port of the engine 118. The regulator 104B may include suitable logic, control system, and interfaces that may be associated with the actuation mechanism 104 and configured to control the sealing pressure (such as a pressure of the pressurization fluid) for the actuator 104A to seal the valve 114 with the corresponding port of the engine 118. For example, the regulator 104B may be a valve that controls the sealing pressure of the pressurization fluid (which may be released from the flow control device 106) at a desired value, using a negative feedback from a default pressure. Examples of the regulator 104B may include, but not limited to, a pressure reducing regulator, a back-pressure regulator, a differential pressure regulator, a single stage regulator, or a multi-stage regulator.

The flow control device 106 may include suitable logic, control system, and interfaces that may be associated with the actuation mechanism 104 and configured to control a flow of the pressurization fluid (such as a release and/or a halt of the pressurization fluid) to the combustion chamber 116. In an embodiment, the flow control device 106 may be disposed in the combustion chamber 116 and configured to allow a charge of the pressurized fluid in the combustion chamber 116. Based on the release of the pressurization fluid from the flow control device 106 to the combustion chamber 116, there may be an increase in pressure in the combustion chamber 116 where the valve 114 is sealed with the corresponding port of the engine 118. For example, the flow control device 106 may be a valve that controls the flow of the pressurization fluid in the combustion chamber 116 for the determination of the leakage in the valve 114 that may be sealed with the corresponding port of the engine 118. Examples of the flow control device 106 may include, but not limited to, a gate valve, a globe valve, a pinch valve, a diaphragm valve, or a needle valve.

The plurality of sensors 108 may include suitable logic, control system, and interfaces that may be configured to detect a flow rate of the pressurization fluid in at least one of: the inlet port 116A of the combustion chamber 116, the exhaust port 116B of the combustion chamber 116, or the charging port 116C of the combustion chamber 116. For example, the plurality of sensors 108 may include, but are not limited to, a first sensor 108A, a second sensor 108B, and a third sensor 108C. The first sensor 108A may be disposed in the inlet port 116A of the combustion chamber 116 to detect a first flow rate of the pressurization fluid in the inlet port 116A. The second sensor 108B may be disposed in the exhaust port 116B of the combustion chamber 116 to detect a second flow rate of the pressurization fluid in the exhaust port 116B. The third sensor 108C may be disposed in the charging port 116C of the combustion chamber 116 to detect a third flow rate of the pressurization fluid in the combustion chamber 116. Details of the detection of the first flow rate, the second flow rate, and the third flow rate are further described below with reference to FIG. 1B and, for example, in FIG. 6. In another embodiment, the plurality of sensors 108 may also be disposed in a manifold (such as an inlet manifold or an exhaust manifold) of the engine 118 to detect the flow rate of the pressurization fluid in the corresponding manifold of the engine 118. Details of the detection of the flow rate in the manifold of the engine 118 are further described, for example, in FIG. 4.

Each sensor of the plurality of sensors 108 may include a detection element (not shown) that may be coupled with one of: the port (such as the inlet port 116A, the exhaust port 116B, or the charging port 116C) or the manifold (such as the inlet manifold or the exhaust manifold) of the engine 118 to detect the leakage between the valve 114 and the corresponding port of the engine 118. Examples of the plurality of sensors 108 may include, but not limited to, a mechanical flowmeter, a pressure-based meter, a variable-area flowmeter, an optical flowmeter, a vortex flowmeter, an acoustical flowmeter, an electromagnetic flowmeter, a magnetic flowmeter, or a laser doppler anemometer. Based on the detection of the flow rate from the plurality of sensors 108, the apparatus 102 may control the notification device 110 to generate the alert associated with the status of the leakage between the valve 114 and corresponding port of the engine 118.

The notification device 110 include suitable logic, circuitry, and interfaces that may be configured to generate an alert based on the detected first flow rate and the detected second flow rate. In an embodiment, the notification device 110 may generate the alert based on: the detected first flow rate in the inlet port 116A, the detected second flow rate in the exhaust port 116B, and the detected third flow rate in the charging port 116C of the engine 118. For example, in case the determined flow rate exceeds a predetermined flow rate, the apparatus 102 may determine a presence of the leakage between the valve 114 and the corresponding port of the engine 118 and generate the alert with information associated with the presence of the leakage. In another example, in case the determined flow rate is less than a predetermined flow rate, the apparatus 102 may determine an absence of the leakage between the valve 114 and corresponding port of the engine 118 and generate the alert with information associated with the absence of the leakage.

In an embodiment, the notification device 110 may be configured to remotely alert the operator about the status on the leakage between the valves and corresponding ports of the machine. Therefore, as the operator is remotely notified about the leakage of each valve in the corresponding port of the machine, the operator may save time that may be incurred in a manual inspection of each valve of the machine. In an embodiment, the alert may include one of: an audible notification, a visual notification, or an audio-visual notification. For example, the notification device 110 may include at least one of: an audio device, a display device, or an audio-visual device.

The audio device may include suitable logic, circuitry, and interfaces that may be configured to generate the audible notification for the operator, based on the determined leakage between the valves and the corresponding ports of the engine 118. In an embodiment, the audio device may be configured to control playback of an audio output, determined based on the determined leakage between the valves and the corresponding ports of the engine 118. The audio device may be configured to receive electrical audio signals from the control system 112 and convert the received electrical audio signals into the audio/sound output. In an embodiment, the audio device may be communicably coupled to the apparatus 102, via a communication network (shown in FIG. 2). In another embodiment, the audio device may be integrally formed in the apparatus 102, as an I/O device (shown in FIG. 2). Examples of the audio device may include, but are not limited to, a loudspeaker, a woofer, a sub-woofer, a tweeter, a wireless speaker, a wired speaker, a soundcard, a headphone, or other speakers or sound output device.

The display device may include suitable logic, circuitry, and interfaces that may be configured to display the visual notification (such as information associated with a location of the leakage) to the operator, based on the determined leakage between the valves and the corresponding ports of the engine 118. The display device may be a touch screen, which may enable the operator to provide a user-input (for example, recheck the valve 114 to confirm the presence of the leakage) via the display device. The touch screen may be at least one of a resistive touch screen, a capacitive touch screen, or a thermal touch screen. In an embodiment, the display device may be communicably coupled to the apparatus 102, via the communication network. In another embodiment, the display device may be integrally formed in the apparatus 102, as the I/O device. Examples of the display device may include, but not limited to, at least one of: a liquid crystal display (LCD) display, a Light Emitting Diode (LED) display, a plasma display, or an Organic LED (OLED) display technology, or other display devices. In accordance with an embodiment, the display device may refer to a display screen of a head-mounted device (HMD), a smart-glass device, a see-through display, a projection-based display, an electro-chromic display, or a transparent display.

The audio-visual device may be a combination of audio and visual systems that may be configured to generate the audio-visual notification to the operator, based on the determined leakage between the valves and the corresponding ports of the engine 118. For example, the audio-visual device may be a combination of the audio device and the display device. In an embodiment, the audio-visual device may be a human machine interface (HMI) in the assembly line, which may be configured to transmit the audio-visual alert to the operator, via a display unit (such as the display screen) and an integral audio device (such as a speaker) of the display unit.

The control system 112 may include suitable logic, circuitry, and interfaces that may be configured to control components (such as the actuation mechanism 104, the flow control device 106, and the plurality of sensors 108) of the apparatus 102 to determine the leakage between the valves and corresponding ports of the engine 118. Based on the determination of the leakage, the control system 112 may further control the notification device 110 to generate the alert (such as the audible notification, the visual notification, or the audio-visual notification) for the operator. In an embodiment, the control system 112 may be an integral part of the apparatus 102 that may be configured to control the components of the apparatus 102. In another embodiment, the control system 112 may be an external entity (such as a server) that may be remotely coupled to the apparatus 102 and configured to control the components of the apparatus 102. Details of the control system 112 are further described, for example, in FIG. 2.

The valve 114 may be configured to releasably control a corresponding port of the engine 118. In one example, the valve 114 may control the inlet port 116A of the engine 118. In another example, the valve 114 may control the exhaust port 116B of the engine 118. In an embodiment, the valve 114 may be a poppet valve and configured to be biased by a valve spring (not shown) and further disposed in a valve guide (not shown) coupled to at least one port (such as the inlet port or the exhaust port) of the engine 118. Other examples of the valve 114 may include, but not limited to, a sleeve valve, a slide valve, a rotary valve, etc. In an embodiment, the valve 114 may further include a valve seat, a valve stem, and a valve tip. The valve seat of the valve 114 may be configured to releasably close at least one port (such as the inlet port 116A or the exhaust port 116B) of the engine 118. The valve stem of the valve 114 may be slidably disposed on the valve guide and the valve tip of the valve 114 may protrude from the valve guide. Based on the release of the pressurized fluid in the combustion chamber 116 via the flow control device 106, the apparatus 102 may detect the flow rate of the pressurized fluid in corresponding ports of the engine 118 and determine the leakage in the valve 114 that may be sealed to the corresponding port of the engine 118.

The combustion chamber 116 may include a suitable design, shape and structure, that may be configured to receive the pressurized fluid from the flow control device 106 of the apparatus 102. Based on the reception of the pressurized fluid, the apparatus 102 may detect the flow rate of the pressurized fluid in corresponding ports (such as the inlet port 116A, the exhaust port 116B, and the charging port 116C) of the combustion chamber 116 of the engine 118 and determine the leakage in the valve 114 that may be sealed to the corresponding port of the engine 118. In an embodiment, the combustion chamber 116 may be a substantially cylindrical cavity located in the engine 118 in which a fuel/air mixture is burned for combustion. The inlet port 116A may be configured to receive compressed air and/or air-fuel mixture. The exhaust port 116B may be configured to release exhaust gases that may be generated based on the combustion of the received compressed air and/or air-fuel mixture. The charging port 116C may be configured to initiate the combustion on the received compressed air and/or air-fuel mixture, via a compressed aerosol of fuel and/or an electric spark respectively. In an embodiment, the charging port 116C may be a port that may be located at a top-dead-center (TDC) 116D of the combustion chamber 116 and configured to allow the charge of the pressurized fluid to the combustion chamber 116. In an example, the flow control device 106 (shown in FIG. 1A) may be disposed in the charging port 116C of the combustion chamber 116 and configured to allow the charge of the pressurized fluid in the combustion chamber 116.

The engine 118 may be configured to hold a valve train (such as the valve 114) in a plurality of ports (such as the inlet port 116A and the exhaust port 116B) of the engine 118. The engine 118 may also include other components (such as a spark plug, a fuel injector, a piston, a crankshaft, etc.). Description of other components are avoided in the disclosure for the sake of brevity. In an embodiment, based on an arrangement of the valve train in the plurality of ports, the engine 118 may have a plurality of configurations. For example, in one implementation, the engine 118 may have a loop-flow configuration (i.e., the valve train may be disposed in a single side on the engine 118), an inline cross flow configuration (i.e., the valve train may be disposed on opposing sides on the engine), or an offset cross-flow configuration (i.e., the inlet port 116A and the exhaust port 116B in each combustion chamber (such as the combustion chamber 116) of the engine 118 may be disposed on opposing sides and offset from each other).

In operation, the apparatus 102 may be aligned with the engine 118, via the pallet 120. The pallet 120 may be configured to align the valve 114 of the combustion chamber 116 with the actuator 104A of the actuation mechanism 104. In an embodiment, the pallet 120 may facilitate an improved alignment of the actuator 104A with the valve 114 of the engine 118, which may enhance the sealing of the valve 114 with the corresponding port of the engine 118. Based on the alignment, the apparatus 102 may control the actuation mechanism 104 to activate the actuator 104A (such as via one or more kinematic linkages) and seal the valve 114 (with corresponding ports such as one of: the inlet port 116A or the exhaust port 116B) of the combustion chamber 116 of the engine 118.

In an embodiment, the actuator 104A may transmit a uniformly distributed pressure to seal the valve 114 of the combustion chamber 116. For example, the uniformly distributed pressure may correspond to an equally distributed pressure on a surface area 114A of the valve 114 of the combustion chamber 116 to seal the valve 114 of the combustion chamber 116. Therefore, because of the uniformly distributed pressure of the actuator, there may be an improvement in sealing of the valves and corresponding ports, which may avoid any false-positive measurement (such as the incorrect measurement) of the leakage between the valves and the ports of the machine.

In an embodiment, the actuator 104A may angularly align the valve 114 with the valve guide associated with the engine 118 and seal the valve 114 of the combustion chamber 116, such that, the valve 114 may be sealed at a first angle 114B that may be parallel to a second angle (not shown) of the valve guide. In an example, the first angle 114B may be measured between a surface of the valve 114 and a surface of one of: an inlet manifold or an exhaust manifold (described in FIG. 4) of the engine 118. In another example, the second angle may be measured between a surface of the valve guide and a surface of one of: the inlet manifold or the exhaust manifold of the engine 118. As the actuator 104A facilitates an angular alignment of the valve 114 with the valve guide (such as the first angle 114B of the valve 114 to be in parallel with the second angle of the valve guide), there may not be any interference between the valve 114 and the valve guide when sealed with the actuator 104A. Therefore, based on the angular alignment of the valve 114 with the valve guide of the engine 118 via the actuator 104A, there may be an improvement in sealing of the valves and corresponding ports, which may avoid any false-positive measurement (such as the incorrect measurement) of the leakage between the valves and the ports of the machine.

The apparatus 102 may further control the flow control device 106 to control the flow of the pressurized fluid to the combustion chamber 116. The apparatus 102 may further control the plurality of sensors 108 to detect the first flow rate in the inlet port 116A of the combustion chamber 116 and detect the second flow rate in the exhaust port 116B of the combustion chamber 116. The apparatus 102 may further determine the leakage of the pressurized fluid from the combustion chamber 116 based on the detected first flow rate and the detected second flow rate. For example, in case there is a release of the pressurized fluid from the combustion chamber 116 to the inlet port 116A, via the valve 114, the first sensor 108A may detect the first flow rate to determine the leakage of the pressurized fluid from the combustion chamber 116. In another example, in case there is a release of the pressurized fluid from the combustion chamber 116 to the exhaust port 116B, via the valve 114, the second sensor 108B may detect the second flow rate to determine the leakage of the pressurized fluid from the combustion chamber 116. In yet another example, in case there is a release of the pressurized fluid from the combustion chamber 116 to both the inlet port 116A and the exhaust port 116B, via the valve 114, the first sensor 108A and the second sensor 108B, may detect the first flow rate and the second flow rate respectively. Based on the detection of the first flow rate and the second flow rate, the apparatus 102 may determine the leakage of the pressurized fluid from the combustion chamber 116. The apparatus 102 may further control the notification device 110 to generate the alert based on the determined leakage of the pressurized fluid from the combustion chamber 116. For example, in case there is a presence of the leakage, the apparatus 102 may control the display device associated with the notification device 110 to display, for example, a red-colored illumination. In another example, in case there is an absence of the leakage, the apparatus 102 may control the display device associated with the notification device to display, for example, a green-colored illumination.

In an embodiment, the apparatus 102 may determine information associated with the status (such as the presence or the absence) of the leakage of the pressurized fluid from the combustion chamber 116 based on the detected first flow rate and the detected second flow rate. Based on the determined information, the apparatus 102 may control the radio-frequency tag 122 associated with the engine 118 to store the status of the leakage associated with the valve 114 of the combustion chamber 116 of the engine 118. Details of the determination of the leakage in the valve 114 are further described, for example, in FIG. 2 and FIG. 3.

Figure 2:
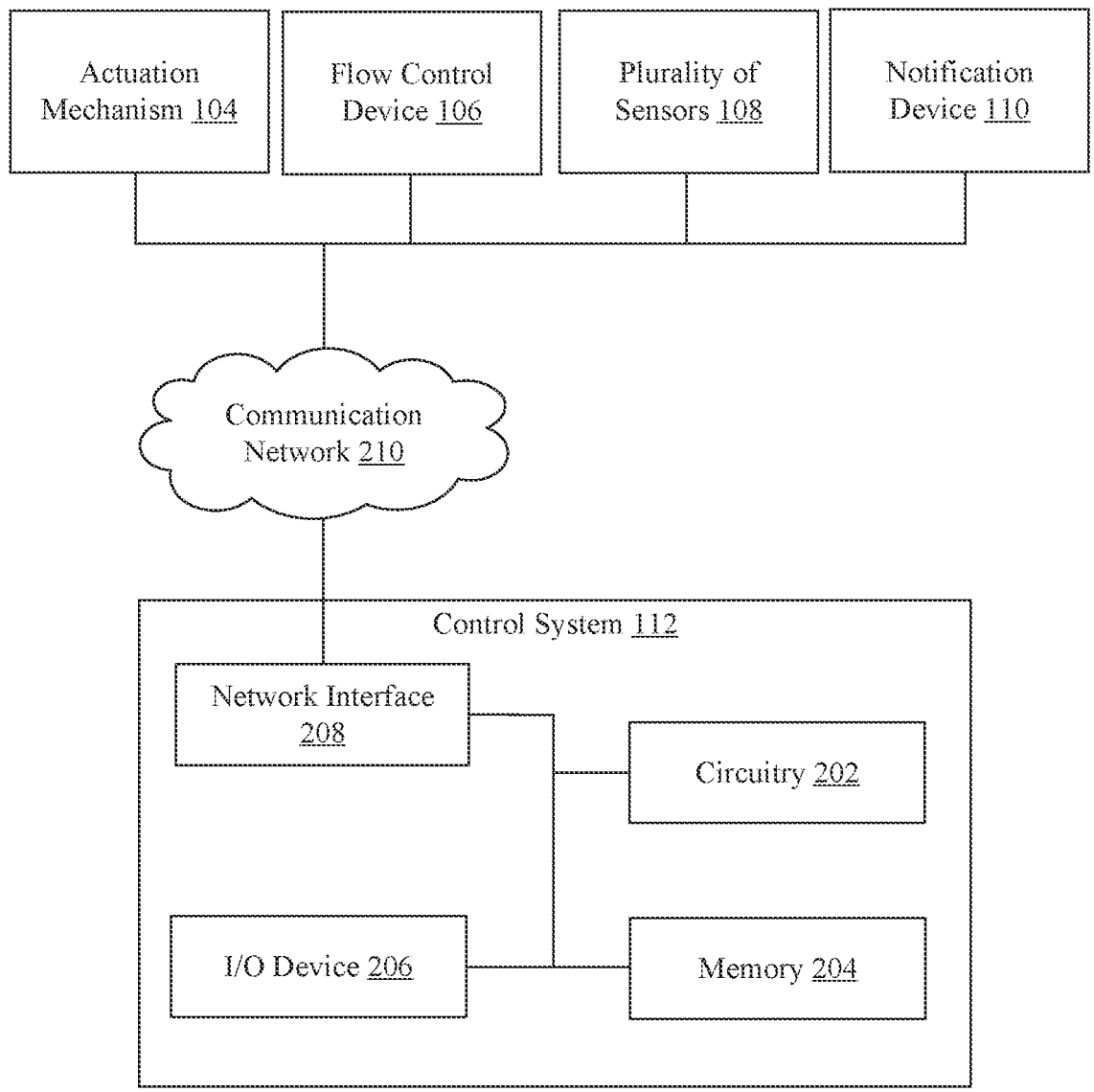
FIG. 2 is a block diagram of a control system of the apparatus of FIG. 1, in accordance with an embodiment of the disclosure.

FIG. 2 is a block diagram of a control system of the apparatus of FIG. 1, in accordance with an embodiment of the disclosure. FIG. 2 is explained in conjunction with elements from FIGS. 1A-1B. With reference to FIG. 2, there is shown a block diagram 200 of the control system 112 of the apparatus 102. The control system 112 may include circuitry 202, a memory 204, a I/O device 206, and a network interface 208. The control system 112 may be remotely coupled, via a communication network 210, with one of: the actuation mechanism 104, the flow control device 106, the plurality of sensors 108, or the notification device 110, to transmit control instructions that may be associated with the determination of the leakage between the valves and corresponding ports of the engine 118. In another embodiment, the apparatus 102 may directly include one of: the actuation mechanism 104, the flow control device 106, the plurality of sensors 108, or the notification device 110. In such cases, the control system 112 may be directly coupled with one of: the actuation mechanism 104, the flow control device 106, the plurality of sensors 108, or the notification device 110, to transmit control instructions that may be associated with the determination of the leakage between the valves and corresponding ports of the engine 118.

The circuitry 202 may include suitable logic, control system, and/or interfaces that may be configured to execute program instructions associated with different operations to be executed by the apparatus 102. For example, some of the operations may include, but are not limited to, control of the actuation mechanism 104 to activate the actuator 104A of the actuation mechanism 104 and seal the valve 114 of the combustion chamber 116 of the engine 118 based on the activation of the actuator 104A, control of the flow control device 106 to control the flow of the pressurized fluid to the combustion chamber 116, control of the plurality of sensors 108 to determine the first flow rate in the inlet port 116A and the second flow rate in the exhaust port 116B, determination of the leakage of the pressurized fluid from the combustion chamber 116 based on the detected first flow rate and the detected second flow rate, and control of the notification device 110 to generate the alert (such as the audible notification, the visual notification, or the audio-visual notification) based on the determined leakage of the pressurized fluid from the combustion chamber.

The circuitry 202 may include any suitable special-purpose or general-purpose computer, computing entity, or processing device including various computer hardware or software modules and may be configured to execute instructions stored on any applicable computer-readable storage media (for example, the memory 204). The circuitry 202 may be implemented based on several processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog control system configured to interpret and/or to execute program instructions and/or to process data. The circuitry 202 may include any number of processors that may be configured to, individually or collectively, perform any number of operations of the control system 112, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, control system, interfaces, and/or code that may be configured to store the set of instructions executable by the circuitry 202. In an embodiment, the memory 204 may be configured to store one of: information associated with the sealing pressure of the regulator 104B, information associated with the first flow rate in the inlet port 116A, information associated with the second flow rate in the exhaust port 116B, information associated with the third flow rate in the charging port 116C, information associated with the determination of the leakage, and information associated with the generated alert based on the determined leakage. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, control system, interfaces, and/or code that may be configured to receive user inputs (for example, via the touchscreen-based display device of the notification device 110) and may render output (for example, via the actuator 104A) in response to the received user inputs. In an embodiment, the I/O device 206 may be integrally coupled to the apparatus 102 to receive the user inputs (for example, directly controlling the apparatus 102, or remotely controlling the apparatus 102 via an operator device, such as a mobile phone) and may render output (for example, via the actuator 104A) in response to the received user inputs. For example, the operator may provide user inputs on the touchscreen of the notification device 110 to selectively control the actuator 104A for selectively testing a specific valve (such as the valve 114) of the combustion chamber 116.

In another embodiment, the I/O device 206 may be communicably coupled to the apparatus 102 to receive the user inputs and may render output, via the communication network 210. In some embodiments, the I/O device 206 may include the actuator 104A of the actuation mechanism 104, the flow control device 106, the plurality of sensors 108, or the notification device 110. In other embodiment, the I/O device 206 may include various input and output devices that may be configured to communicate with the circuitry 202. Examples of such input and output devices may include, but are not limited to, a touch screen, a touch pad, a keyboard, a mouse, a joystick, a microphone, a display device, a speaker, an infotainment system, or an image sensor.

The network interface 208 may include suitable logic, control system, and interfaces that may be configured to facilitate communication between the circuitry 202 and external devices (such as the actuation mechanism 104, the flow control device 106, the plurality of sensors 108, or the notification device 110), via the communication network 210. The network interface 208 may be implemented by use of various technologies to support wired or wireless communication of the apparatus 102 with the communication network 210. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control system. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The communication network 210 may include a communication medium through which the apparatus 102 and one of: the actuation mechanism 104, the flow control device 106, the plurality of sensors 108, or the notification device 110, may communicate with each other. The communication network 210 may be one of a wired connection or a wireless connection. Examples of the communication network 210 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in a network environment of the apparatus 102 may be configured to connect to the communication network 210 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the control system 112 may control the actuation mechanism 104 to activate the actuator 104A (such as via one or more kinematic linkages) and seal the valve 114 (with corresponding ports such as one of: the inlet port 116A or the exhaust port 116B) of the combustion chamber 116 of the engine 118. In an embodiment, the actuator 104A may transmit a uniformly distributed pressure to seal the valve 114 of the combustion chamber 116. For example, the uniformly distributed pressure may correspond to an equally distributed pressure on a surface area 114A (shown in FIG. 1B) of the valve 114 of the combustion chamber 116 to seal the valve 114 of the combustion chamber 116. Therefore, because of the uniformly distributed pressure of the actuator, there may be an improvement in sealing of the valves and corresponding ports, which may avoid any false-positive measurement (such as the incorrect measurement) of the leakage between the valves and the ports of the machine.

The control system 112 may further control the flow control device 106 to control the flow of the pressurized fluid to the combustion chamber 116. The control system 112 may further control the plurality of sensors 108 to detect the first flow rate in the inlet port 116A of the combustion chamber 116 and detect the second flow rate in the exhaust port 116B of the combustion chamber 116. The control system 112 may further determine the leakage of the pressurized fluid from the combustion chamber 116 based on the detected first flow rate and the detected second flow rate. The control system 112 may further control the notification device 110 to generate the alert based on the determined leakage of the pressurized fluid from the combustion chamber 116.

In an embodiment, the control system 112 may determine information associated with the status (such as the presence or the absence) of the leakage of the pressurized fluid from the combustion chamber 116 based on the detected first flow rate and the detected second flow rate. Based on the determined information, the control system 112 may control the radio-frequency tag 122 associated with the engine 118 to store the status of the leakage associated with the valve 114 of the combustion chamber 116 of the engine 118. Details of the control of the actuator 104A are further described, for example, in FIG. 3.

Figure 3:
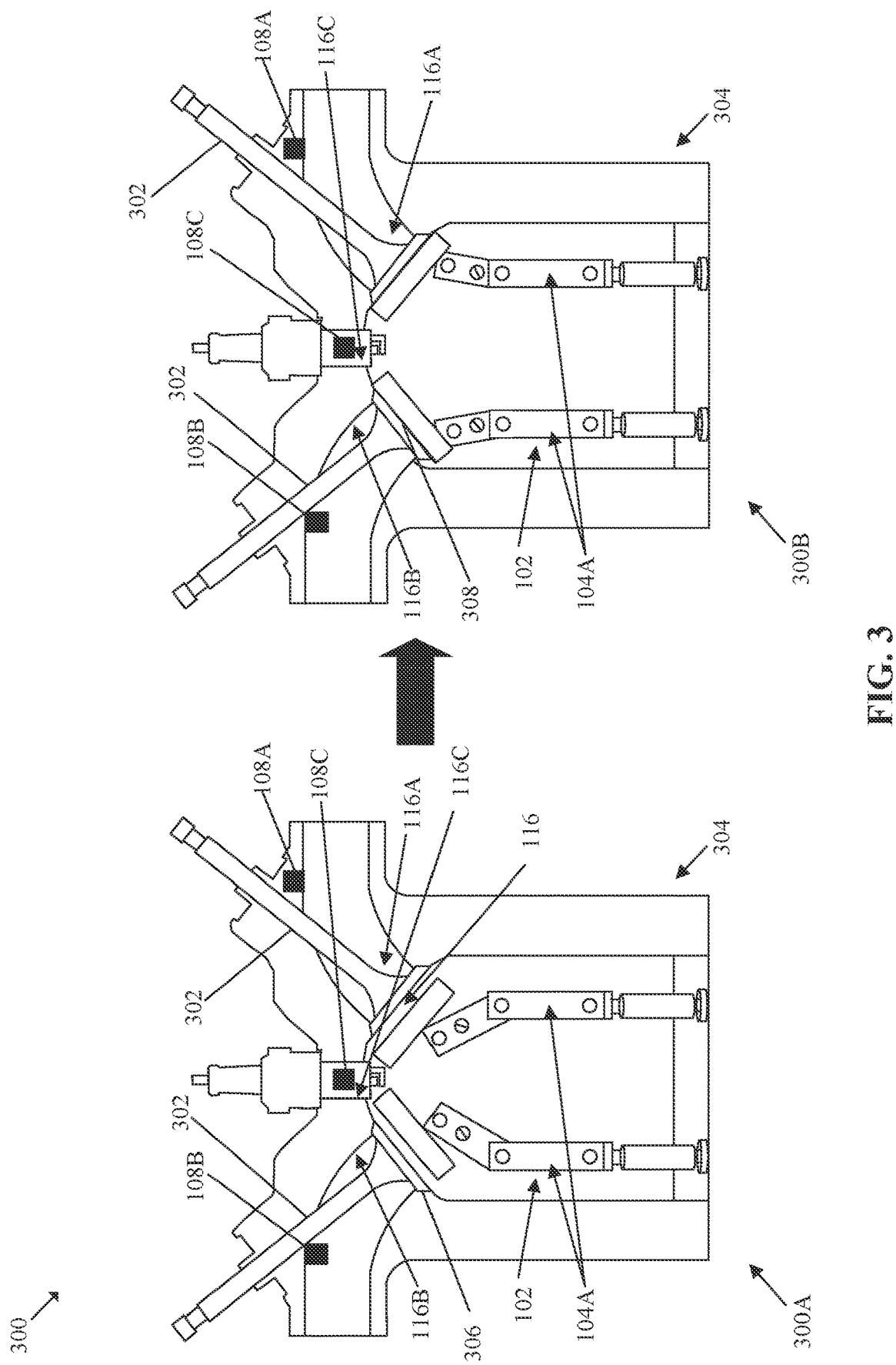
FIG. 3 is a diagram that illustrate a first exemplary scenario for leak testing of valves, via the apparatus of FIG. 1, in accordance with an embodiment of the disclosure.

FIG. 3 is a diagram that illustrate a first exemplary scenario for leak testing of valves, via the apparatus of FIG. 1, in accordance with an embodiment of the disclosure. FIG. 3 is explained in conjunction with elements from FIGS. 1A-1B and FIG. 2. With reference to FIG. 3, there is shown a first exemplary scenario 300 for leak testing with the apparatus 102. The first exemplary scenario 300 may include a plurality of configurations, such as, but not limited to, an initial configuration 300A and an engaged configuration 300B of a master valve 302 in a master engine head 304.

The master valve 302 may be a pre-tested valve that may not have any deformities and no leakage that may be present with corresponding ports of the master engine head 304. Prior to the leakage testing with the apparatus 102, the apparatus 102 may be calibrated (such as, a regulation on the pressurized fluid) based on the master valve 302 of the master engine head 304. For example, prior to the leakage testing of the valve 114, the actuator 104A of the apparatus 102 may be aligned with the master valve 302 of the master engine head 304, via the pallet 120, for the calibration of the pressurized fluid.

In the initial configuration 300A, there is shown the actuator 104A at an initial position 306. At the initial position 306, the actuator 104A may be aligned and spaced apart from the master valve 302. The actuator 104A may angularly align the master valve 302 with a valve guide associated with the master engine head 304 and seal the master valve 302 with the corresponding port of the master engine head 304.

In the engaged configuration 300B, there is shown the actuator 104A at an engaged position 308. At the engaged position 308, the actuator 104A may be mated with the master valve 302. The actuator 104A may have a uniform surface area (such as the flat surface area) with a uniformly distributed pressure that may structurally conform to a surface area (such as a flat surface area) of the master valve 302. Based on the control of the actuation mechanism 104, the actuator 104A having the uniform surface area may directly mate with the surface area of the master valve 302 and may seal the master valve 302 with the corresponding port of the master engine head 304.

In operation, the control system 112 of the apparatus 102 may control the actuation mechanism 104 to activate the actuator 104A and seal the master valve 302 of the master engine head 304. The control system 112 may further control the regulator 104B (shown in FIG. 1B) associated with the actuation mechanism 104 to adjust a first sealing pressure for the actuator 104A to seal the master valve 302. For example, the first sealing pressure may correspond to a pressure of the actuator 104A applied on the master valve 302 to prevent a leakage of the pressurized fluid from the master engine head 304. Based on the adjusted first sealing pressure, the control system 112 may determine a second sealing pressure to seal the valve 114 of the combustion chamber 116 of the engine 118 based on information associated with the first sealing pressure of the actuator 104A to seal the master valve 302. In an example, the second sealing pressure may correspond to a pressure of the actuator 104A that may be applied on the valve 114 of the combustion chamber 116 that may be intended to seal the valve 114.

Based on the determination of the second sealing pressure, the master valve 302 of the master engine head 304 may be removed from the apparatus 102, and the valve 114 of the engine 118 that may be intended to test for the leakage is aligned and mated with the actuator 104A of the apparatus 102. Based on the mating and subsequent sealing of the valve 114 with corresponding port of the engine 118, the control system 112 may control the actuation mechanism 104 to activate the actuator 104A and seal the valve 114 of the combustion chamber 116 at the determined second sealing pressure. Therefore, as the apparatus 102 is configured to provide an optimal sealing pressure (for example, the second sealing pressure for the valve 114 that may be determined based on a calibration with the first sealing pressure on the master valve 302) on the valve 114, there may an optimal sealing of the valve 114 with corresponding port of the engine 118 without any deformity (such as a change in shape of the valve 114 due to the pressure of the pressurization fluid) that may occur in the valve 114 because of the pressurization fluid.

Figure 4:
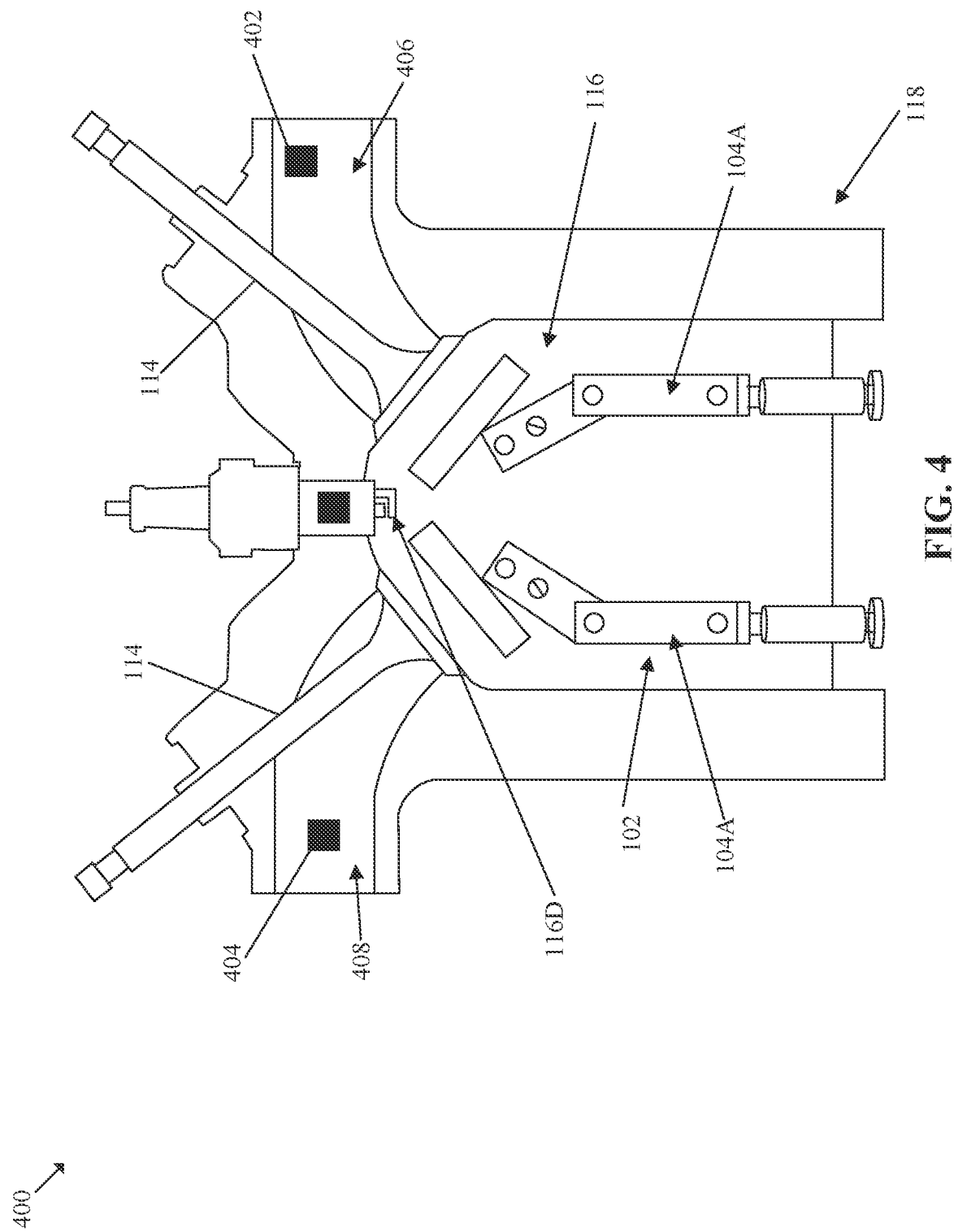
FIG. 4 is a diagram that illustrate a second exemplary scenario for leak testing of valves, via the apparatus of FIG. 1, in accordance with an embodiment of the disclosure.

FIG. 4 is a diagram that illustrate a second exemplary scenario for leak testing of valves, via the apparatus of FIG. 1, in accordance with an embodiment of the disclosure. FIG. 4 is explained in conjunction with elements from FIGS. 1A-1B, FIG. 2, and FIG. 3. With reference to FIG. 4, there is shown a second exemplary scenario 400 for leak testing of the apparatus 102. In the second exemplary scenario 400, the plurality of sensors 108 of the apparatus 102 may further include a fourth sensor 402 and a fifth sensor 404. The fourth sensor 402 may be disposed in an inlet manifold 406 of the combustion chamber 116 to detect the first flow rate of the pressurized fluid in the inlet manifold 406. The fifth sensor 404 may be disposed in an exhaust manifold 408 of the combustion chamber 116 to detect the second flow rate of the pressurized fluid in the exhaust manifold 408.

In operation, the control system 112 may control the actuation mechanism 104 to activate the actuator 104A (such as via one or more kinematic linkages) and seal the valve 114 (with corresponding ports such as one of: the inlet port 116A or the exhaust port 116B) of the combustion chamber 116 of the engine 118. In an embodiment, the actuator 104A may transmit a uniformly distributed pressure to seal the valve 114 of the combustion chamber 116. The control system 112 may further control the flow control device 106 to control the flow of the pressurized fluid to the combustion chamber 116. The control system 112 may further control the plurality of sensors 108 to detect the first flow rate, via the fourth sensor 402 in the inlet manifold 406 of the combustion chamber 116 and detect the second flow rate, via the fifth sensor 404 in the exhaust manifold 408 of the combustion chamber 116. The control system 112 may further determine the leakage of the pressurized fluid from the combustion chamber 116 based on the detected first flow rate and the detected second flow rate. The control system 112 may further control the notification device 110 to generate the alert based on the determined leakage of the pressurized fluid from the combustion chamber 116.

Figure 5:
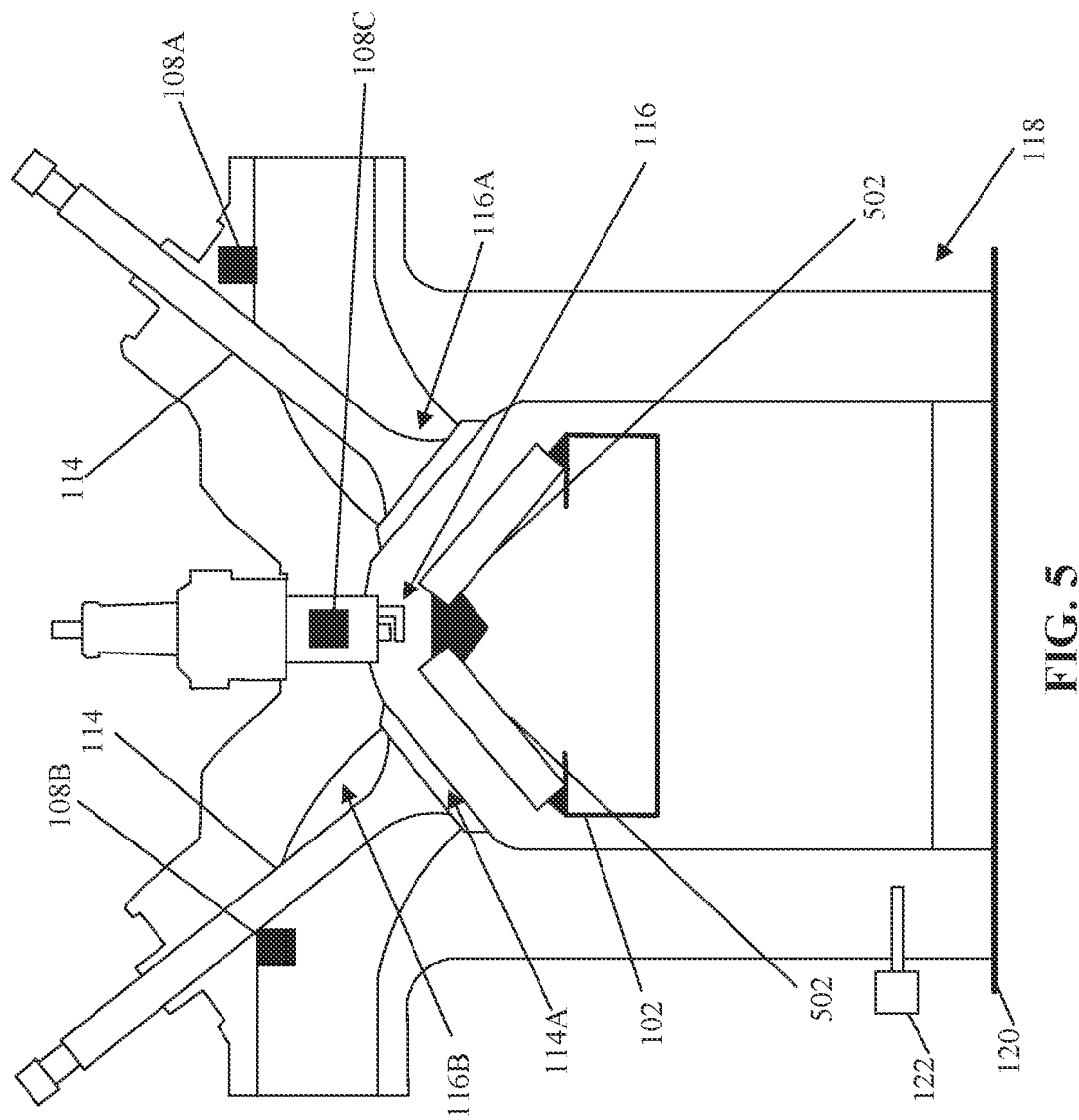
FIG. 5 is a diagram that illustrate a third exemplary scenario for leak testing of valves, via the apparatus of FIG. 1, in accordance with an embodiment of the disclosure.

FIG. 5 is a diagram that illustrate a third exemplary scenario for leak testing of valves, via the apparatus of FIG. 1, in accordance with an embodiment of the disclosure. FIG. 5 is explained in conjunction with elements from FIGS. 1A-1B, FIG. 2, FIG. 3, and FIG. 4. With reference to FIG. 5, there is shown a third exemplary scenario 500 for leak testing of the apparatus 102. In the third exemplary scenario 500, the actuation mechanism 104 of the apparatus 102 may include press pucks 502.

The press pucks 502 may include suitable design, shape and structure, which may be configured to mate with the valve 114 and subsequently seal the valve 114 with corresponding port of the combustion chamber 116. Each puck of the press pucks 502 may have a substantially rectangular structure. The substantially rectangular structure is merely an example, and the press pucks 502 may have any other structure, such as, but not limited to, a substantially cylindrical structure, or a substantially polygonal structure. Examples of the press pucks 502 may include, but not limited to, a cushion pad, or a pressure pad, which may be configured to directly mate with the valve 114 based on the pressurized fluid and seal the valve 114 with corresponding port of the combustion chamber 116.

In operation, the control system 112 may control the actuation mechanism 104 to directly activate the press pucks 502 (such as the pressure pad) and seal the valve 114 (with corresponding ports such as one of: the inlet port 116A or the exhaust port 116B) of the combustion chamber 116 of the engine 118. In an embodiment, the press pucks 502 may transmit a uniformly distributed pressure to seal the valve 114 of the combustion chamber 116. Based on the sealing of the valve 114 with corresponding port of the combustion chamber 116, the apparatus 102 may detect the flow rate of the pressurized fluid and determine the leakage between the valve 114 and corresponding port of the combustion chamber 116.

Figure 6:
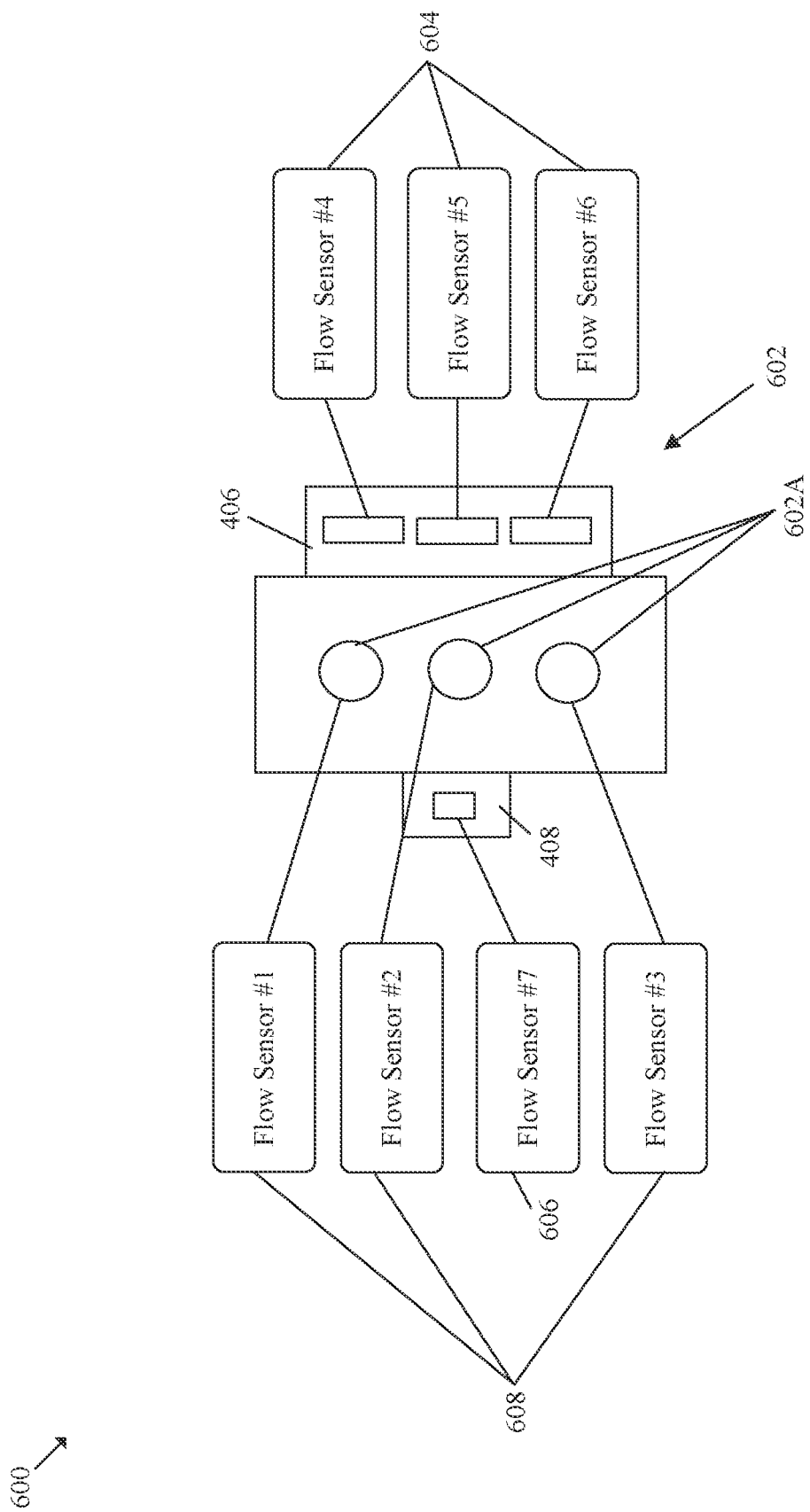
FIG. 6 is a diagram that illustrate a fourth exemplary scenario for leak testing of valves, via the apparatus of FIG. 1, in accordance with an embodiment of the disclosure.

FIG. 6 is a diagram that illustrate a fourth exemplary scenario for leak testing of valves, via the apparatus of FIG. 1, in accordance with an embodiment of the disclosure. FIG. 6 is explained in conjunction with elements from FIGS. 1A-1B, FIG. 2, FIG. 3, FIG. 4, and FIG. 5. With reference to FIG. 6, there is shown a fourth exemplary scenario 600 for leak testing of the apparatus 102. In the fourth exemplary scenario 600, the apparatus 102 may be coupled with a plurality of combustion chambers 602A of an engine 602.

In such scenario of the plurality of combustion chambers 602A, the actuation mechanism 104 of the apparatus 102 may include a plurality of actuators (not shown). Each actuator of the plurality of actuators may be configured to seal a corresponding valve of a plurality of valves (not shown) of the plurality of combustion chambers 602A of the engine 602. For example, the pallet 120 (shown in FIG. 1B) may be configured to align each valve of the plurality of valves with a corresponding actuator of the plurality of actuators of the actuation mechanism 104. The pallet 120 may facilitate an improved alignment of each valve of the plurality of valves with the corresponding actuator of the plurality of actuators of the engine 602, which may enhance the sealing of each valve of the plurality of valves with the corresponding port of the engine 602. The apparatus 102 may further include a plurality of flow control devices (not shown) configured to control a flow of a pressurized fluid to each combustion chamber of the plurality of combustion chambers 602A.

The apparatus 102 may further include the plurality of sensors 108 that may include a first set of sensors 604, a second set of sensors 606, and a third set of sensors 608. In an example, each sensor of the first set of sensors 604 may be disposed in a corresponding inlet channel of the inlet manifold 406 to detect the first flow rate of the pressurized fluid in the inlet manifold 406. In another example, each sensor of the second set of sensors 606 may be disposed in a corresponding exhaust channel of the exhaust manifold 408 to detect the second flow rate of the pressurized fluid in the exhaust manifold 408. In yet another example, each sensor of the third set of sensors 608 may be disposed in a corresponding charging port of each combustion chamber of the plurality of combustion chambers 602A, to detect the third flow rate of the pressurized fluid in the corresponding combustion chamber of the plurality of combustion chambers 602A. The apparatus 102 may include the notification device 110 (shown in FIGS. 1A and 2) that may be configured to generate the alert (such as the audible notification, the visual notification, or the audio-visual notification) based on one of: the detected first flow rate, the detected second flow rate and the detected third flow rate in the plurality of combustion chambers 602A of the engine 602.

In operation, the control system 112 may control the actuation mechanism 104 to activate each actuator of the plurality of actuators (such as via one or more kinematic linkages) and seal each valve of the plurality of valves with corresponding ports of each combustion chamber of the plurality of combustion chambers 602A of the engine 602. The control system 112 may further control each flow control device of the plurality of flow control devices to control the flow of the pressurized fluid to each combustion chamber of the plurality of combustion chambers 602A of the engine 602. The control system 112 may further control the first set of sensors 604 to detect the first flow rate in the inlet manifold 406 of the engine 602. The control system 112 may further control the second set of sensors 606 to detect the second flow rate in the exhaust manifold 408 of the engine 602. The control system 112 may further control the third set of sensors 608 to detect the third flow rate in each combustion chamber of the plurality of combustion chambers 602A of the engine 602.

The control system 112 may further determine the leakage of the pressurized fluid from the combustion chamber 116 based on one of: the detected first flow rate, the detected second flow rate, and the detected third flow rate. The control system 112 may further control the notification device 110 to generate the alert based on the determined leakage of the pressurized fluid in each combustion chamber of the plurality of combustion chambers 602A of the engine 602.

FIG. 7 is a flowchart that illustrates an exemplary method for leak testing of valves, via the apparatus of FIG. 1, in accordance with an embodiment of the disclosure. FIG. 7 is explained in conjunction with elements from FIGS. 1A-1B, FIG. 2, FIG. 3, FIG. 4, FIG. 5, and FIG. 6. With reference to FIG. 7, there is shown a flowchart 700 that depicts a method for leak testing of valve 114 via the apparatus 102 or the control system 112. The method illustrated in the flowchart 700 may start from 702.

At 702, the actuation mechanism 104 may be controlled to activate the actuator 104A of the actuation mechanism 104 and seal the valve 114 of the combustion chamber 116 of the engine 118 based on the activation of the actuator 104A. In an embodiment, the apparatus 102 may control the actuation mechanism 104 to activate the actuator 104A and seal the valve 114 of the combustion chamber 116 of the engine 118 based on the activation of the actuator 104A as described, for example, in FIGS. 1A-1B, FIG. 2, and FIG. 3.

At 704, the flow control device 106 may be controlled to control the flow of the pressurized fluid to the combustion chamber 116. In an embodiment, the apparatus 102 may control the flow control device 106 to control the flow of the pressurized fluid to the combustion chamber 116 as described, for example, in FIGS. 1A-1B and FIG. 2.

At 706, the plurality of sensors 108 may be controlled to detect the first flow rate in the inlet port 116A via the first sensor 108A, and further detect the second flow rate in the exhaust port 116B via the second sensor 108B. In an embodiment, the apparatus 102 may control the plurality of sensors 108 to detect the first flow rate in the inlet port 116A via the first sensor 108A, and further detect the second flow rate in the exhaust port 116B via the second sensor 108B as described, for example, in FIGS. 1A-1B, FIG. 2, FIG. 3, FIG. 4, and FIG. 6.

At 708, the leakage of the pressurized fluid from the combustion chamber 116 may be determined based on the detected first flow rate and the detected second flow rate. In an embodiment, the apparatus 102 may determine the leakage of the pressurized fluid from the combustion chamber 116 based on the detected first flow rate and the detected second flow rate as described, for example, in FIGS. 1A-1B and FIG. 2.

At 710, the notification device 110 may be controlled to generate the alert based on the determined leakage of the pressurized fluid from the combustion chamber 116. In an embodiment, the apparatus 102 may control the notification device 110 to generate the alert based on the determined leakage of the pressurized fluid from the combustion chamber 116 as described, for example, in FIGS. 1A-1B and FIG. 2. Control may pass to end.

The flowchart 700 is illustrated as discrete operations, such as 702, 704, 706, 708, and 710. However, in certain embodiments, such discrete operations may be further divided into additional operations, combined into fewer operations, or eliminated, or rearranged depending on the implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An apparatus, comprising:
   an actuation mechanism which comprises an actuator that is configured to seal a valve of a combustion chamber of an engine;
   a flow control device configured to control a flow of a pressurized fluid to the combustion chamber;
   a plurality of sensors which comprise a first sensor and a second sensor, wherein,
   the first sensor is disposed in an inlet port of the combustion chamber to detect a first flow rate of the pressurized fluid in the inlet port, and
   the second sensor is disposed in an exhaust port of the combustion chamber to detect a second flow rate of the pressurized fluid in the exhaust port; and
   a notification device configured to generate an alert based on the detected first flow rate and the detected second flow rate.

2. The apparatus according to claim 1, further comprising a control system which is configured to:
   control the actuation mechanism to activate the actuator and seal the valve of the combustion chamber;
   control the flow control device to control the flow of the pressurized fluid to the combustion chamber;
   control the plurality of sensors to detect the first flow rate in the inlet port of the combustion chamber and detect the second flow rate in the exhaust port of the combustion chamber;
   determine a leakage of the pressurized fluid from the combustion chamber based on the detected first flow rate and the detected second flow rate; and
   control the notification device to generate the alert based on the determined leakage of the pressurized fluid from the combustion chamber.

3. The apparatus according to claim 1, wherein the alert comprises one of: an audible notification, a visual notification, or an audio-visual notification.

4. The apparatus according to claim 1, further comprising a control system which is configured to:
   control the actuation mechanism to activate the actuator and seal a master valve of a master engine head;
   control a regulator associated with the actuation mechanism to adjust a first sealing pressure for the actuator to seal the master valve, wherein the first sealing pressure corresponds to a pressure of the actuator applied on the master valve to prevent a leakage of the pressurized fluid from the master engine head;
   determine a second sealing pressure to seal the valve of the combustion chamber based on information associated with the first sealing pressure of the actuator to seal the master valve, wherein the second sealing pressure corresponds to a pressure of the actuator applied on the valve of the combustion chamber that is intended to seal the valve; and
   control the actuation mechanism to activate the actuator and seal the valve of the combustion chamber at the determined second sealing pressure.

5. The apparatus according to claim 1, wherein the actuation mechanism comprises one of: a mechanical actuator, an electric actuator, a hydraulic actuator, or a pneumatic actuator, which is configured to selectively seal the valve of the combustion chamber of the engine.

6. The apparatus according to claim 1, wherein the flow control device is disposed in a charging port of the combustion chamber, and wherein the charging port is a port located at a top-dead-center (TDC) of the combustion chamber and configured to initiate combustion on the pressurized fluid by at least one of a compressed aerosol of fuel and an electric spark.

7. The apparatus according to claim 1, wherein the plurality of sensors further comprise a third sensor which is disposed in a charging port of the combustion chamber to detect a third flow rate of the pressurized fluid in the combustion chamber, wherein the charging port is configured to initiate combustion on the pressurized fluid by at least one of a compressed aerosol of fuel and an electric spark, and wherein the notification device is configured to generate the alert based on the detected first flow rate, the detected second flow rate, and the detected third flow rate.

8. The apparatus according to claim 1, wherein, the plurality of sensors further comprise a fourth sensor and a fifth sensor, wherein
the fourth sensor is disposed in an inlet manifold of the combustion chamber to detect the first flow rate of the pressurized fluid in the inlet manifold, and
the fifth sensor is disposed in an exhaust manifold of the combustion chamber to detect the second flow rate of the pressurized fluid in the exhaust manifold.

9. The apparatus according to claim 1, further comprising a control system which is configured to:
determine information associated with a status of a leakage of the pressurized fluid from the combustion chamber based on the detected first flow rate and the detected second flow rate, and
control a radio-frequency tag associated with the engine to store the status of the leakage, based on the determined information.

10. The apparatus according to claim 1, wherein the engine is coupled to a pallet associated with the apparatus, and wherein the pallet is configured to align the valve of the combustion chamber with the actuator of the actuation mechanism.

11. The apparatus according to claim 1, wherein the actuation mechanism is configured to activate the actuator based on one of: a stable pressure or a progressive pressure, wherein
the stable pressure corresponds to a constant pressure of the actuator on the valve of the combustion chamber to seal the valve of the combustion chamber, and
the progressive pressure corresponds to a variable pressure of the actuator on the valve of the combustion chamber to seal the valve of the combustion chamber.

12. The apparatus according to claim 1, wherein the actuator is configured to transmit a uniformly distributed pressure to seal the valve of the combustion chamber, and wherein the uniformly distributed pressure corresponds to an equally distributed pressure on a surface area of the valve of the combustion chamber to seal the valve of the combustion chamber.

13. The apparatus according to claim 1, wherein the actuator is configured to angularly align the valve with a valve guide associated with the engine and seal the valve of the combustion chamber, and wherein the valve is sealed at a first angle that is parallel to a second angle of the valve guide.

14. An apparatus, comprising:
an actuation mechanism which comprises a plurality of actuators, wherein each actuator of the plurality of actuators is configured to seal a corresponding valve of a plurality of valves of a plurality of combustion chambers of an engine;
a plurality of flow control devices configured to control a flow of a pressurized fluid to each combustion chamber of the plurality of combustion chambers;
a plurality of sensors which comprise a first set of sensors and a second set of sensors, wherein,
each sensor of the first set of sensors is disposed in a corresponding inlet channel of an inlet manifold to detect a first flow rate of the pressurized fluid in the inlet manifold, and
each sensor of the second set of sensors is disposed in a corresponding exhaust channel of an exhaust manifold to detect a second flow rate of the pressurized fluid in the exhaust manifold; and
a notification device configured to generate an alert based on the detected first flow rate and the detected second flow rate.

15. The apparatus according to claim 14, wherein the alert comprises one of:
an audible notification, a visual notification, or an audio-visual notification.

16. The apparatus according to claim 14, wherein the actuation mechanism comprises one of: a mechanical actuator, an electric actuator, a hydraulic actuator, or a pneumatic actuator, which is configured to selectively seal the plurality of valves.

17. The apparatus according to claim 14, wherein the plurality of sensors further comprise a third set of sensors which are disposed in a charging port of each combustion chamber of the plurality of combustion chambers, to detect a third flow rate of the pressurized fluid in the corresponding combustion chamber of the plurality of combustion chambers, wherein the charging port is configured to initiate combustion on the pressurized fluid by at least one of a compressed aerosol of fuel and an electric spark and wherein the notification device is configured to generate the alert based on the detected first flow rate, the detected second flow rate, and the detected third flow rate.

18. The apparatus according to claim 14, wherein the engine is coupled to a pallet associated with the apparatus, and wherein the pallet is configured to align each valve of the plurality of valves with a corresponding actuator of the plurality of actuators of the actuation mechanism.

19. The apparatus according to claim 14, wherein the actuation mechanism is configured to activate each actuator of the plurality of actuators based on one of: a stable pressure or a progressive pressure, wherein
the stable pressure corresponds to a constant pressure of each actuator of the plurality of actuators on the corresponding valve of the plurality of valves to seal the corresponding valve, and
the progressive pressure corresponds to a variable pressure of each actuator of the plurality of actuators on the corresponding valve of the plurality of valves to seal the corresponding valve.

20. A method, comprising:
in an apparatus:
controlling an actuation mechanism to activate an actuator of the actuation mechanism and seal a valve of a combustion chamber of an engine based on the activation of the actuator;
controlling a flow control device to control a flow of a pressurized fluid to the combustion chamber;
controlling a plurality of sensors which comprise a first sensor and a second sensor, wherein,
the first sensor is disposed in an inlet port of the combustion chamber to detect a first flow rate of the pressurized fluid in the inlet port, and
the second sensor is disposed in an exhaust port of the combustion chamber to detect a second flow rate of the pressurized fluid in the exhaust port;
determining a leakage of the pressurized fluid from the combustion chamber based on the detected first flow rate and the detected second flow rate; and
controlling a notification device to generate an alert based on the determined leakage of the pressurized fluid from the combustion chamber.

\* \* \* \* \*